June 25, 1929.  F. P. McNULTY  1,718,428
SCRAPING DEVICE FOR FOOTWEAR
Filed June 6, 1928
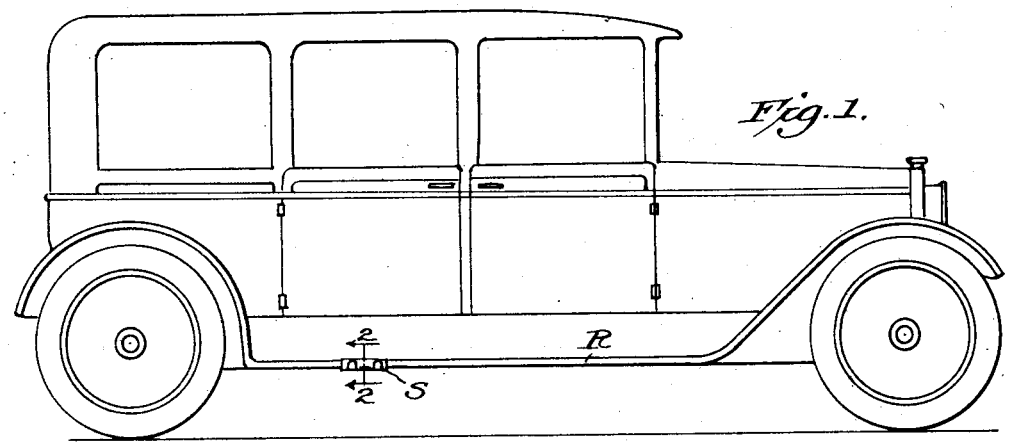
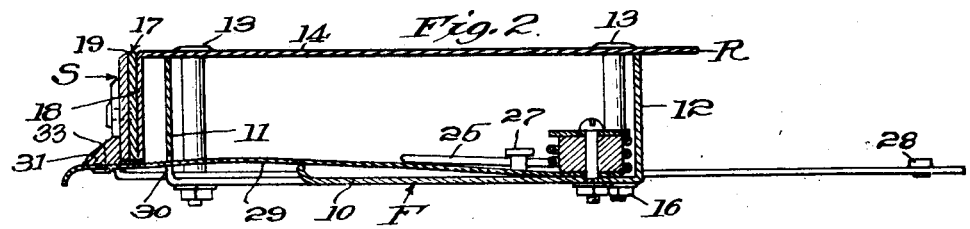
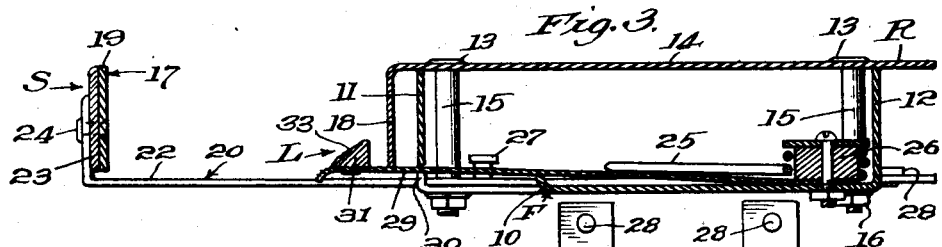
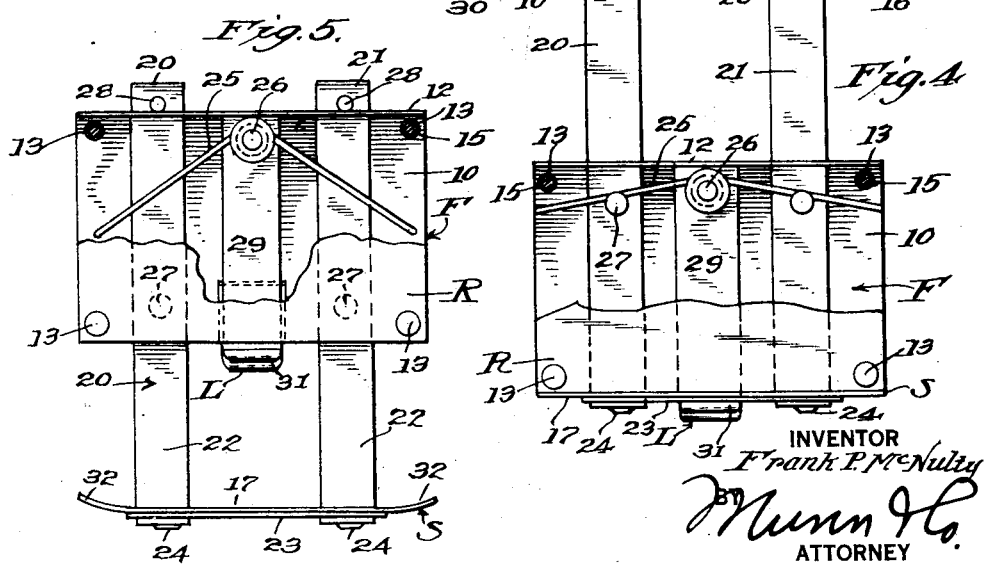
INVENTOR
Frank P. McNulty
BY
ATTORNEY

Patented June 25, 1929.

1,718,428

UNITED STATES PATENT OFFICE.

FRANK P. McNULTY, OF LOS ANGELES, CALIFORNIA.

SCRAPING DEVICE FOR FOOTWEAR.

Application filed June 6, 1928. Serial No. 283,288.

My invention relates to and has for a purpose the provision of a simple, substantial and inexpensive device particularly adapted, although not necessarily, for use on running boards of automobiles, and by which foreign matter such as mud and other road dirt adhering to footwear can be removed therefrom with the utmost ease and dispatch, to the end that the footwear of a person about to enter the automobile can be thoroughly cleaned of such foreign matter and thus prevent soiling of the floor coverings of the automobile as well as eliminating unsanitary conditions in the automobile resulting from carrying the foreign matter thereinto.

It is a further purpose of my invention to provide a device of the above described character, which is in the nature of an attachment capable of being readily applied to a running board of an automobile without modifying the structure of the latter, and embodying a scraping element mounted for movement to occupy an inconspicuous and unobstructing position with respect to persons entering and leaving the automobile, and another position wherein the element is conveniently accessible for the scraping of foreign matter from footwear.

I will describe only one form of scraping device for footwear embodying my invention and will then point out the novel features in claims.

In the accompanying drawing,

Fig. 1 is a view showing in side elevation, an automobile with one form of scraping device embodying my invention, applied to a running board thereof;

Fig. 2 is an enlarged sectional view taken on the line 2—2 of Fig. 1, and illustrating the position on the running board occupied by the device when not in use;

Fig. 3 is a view similar to Fig. 2, and illustrating the position occupied by the device when in use; and Figs. 4 and 5 are plan views, partly broken away, of the device and illustrating, respectively, the corresponding positions of the device as shown in Figs. 2 and 3.

Referring specifically to the drawing in which similar reference characters designate similar parts in each of the several views, my invention in its present embodiment comprises a support or frame designated generally at F and in the present instance constructed of sheet metal to provide a rectangular shaped flat base 10 having its side edges angularly bent to form upstanding flanges 11 and 12, the frame being rigidly secured to the underside of a running board R of the automobile, preferably directly in front of a door of the latter, by means of bolts 13 passing through the tread 14 of the running board and through the base 10 of the frame adjacent the four corners of the latter as shown in Figs. 4 and 5.

The bolts 13 are provided with spacing sleeves 15 and nuts 16 by means of which latter the frame can be drawn upwardly to tightly engage the upper edges of its flanges 11 and 12 with the underside of the running board.

A scraping element designated generally at S and in the present instance constructed of a strip of spring metal to provide a scraping blade 17, is mounted for movement in the frame F to occupy a retracted position wherein it is contiguous to the outer edge of the running board R and abuts the downturned flange 18 of the running board as shown in Figs. 2 and 4, and a projected position wherein it is spaced from the outer edge of the running board as is shown in Figs. 3 and 5. In the retracted position of the blade its upper or scraping edge 19 is substantially flush with the tread 14 of the running board so as to eliminate the possibility of a person tripping over the blade when entering or leaving the automobile.

To provide means for mounting the blade 17 for movement in the frame to occupy the above mentioned positions, in the present instance a pair of bars 20 and 21 constructed of flat strip metal are freely received in registering openings formed in the flanges 11 and 12 so as to be disposed in side by side spaced relation, one end of the bars being upturned to provide extensions 22 which are spanned by a transverse bar 23, the scraper blade 17 and the bar 23 being secured in upright positions to the extensions 22 by rivets 24, to the end that the blade will be slidably mounted in the frame F.

The blade is normally urged towards its projected position by means of a spring 25, which in the present instance is formed from a length of spring wire coiled about a projection or stud 26 secured to the base 10 of the frame, and having its ends engageable with pins 27 fixed to the bars 20 and 21 so as to urge the latter and hence the blade 17 towards its projected position when occupying its retracted position. The projected position of the blade is definitely limited by means of other pins 28 secured to the bars 20 and 21 and engageable with the frame F.

The blade is capable of being releasably retained in its retracted position against the action of the spring 25 by means of a spring latch designated generally at L, and in the present instance comprising a flat spring 29 secured at one end to the base 10 by means of the stud 26 and projecting through a slot 30 in the frame, the spring being provided at its free end with a latching lug 31 normally urged by the spring into engagement with the transverse bar 23 when the blade occupies its retracted position so as to latch the blade against movement towards projected position.

To aid in initiating movement of the blade towards projected position when the latching lug 31 is disengaged from the transverse bar 23, the ends of the blade which project beyond the ends of the bar 23 are normally curved laterally as indicated at 32 so that when the blade is moved to and latched in its retracted position the ends of the blade will be engaged with and flexed by the downturned flange 18 of the running board so as to be placed under tension and thus tend to urge the blade towards its projected position.

The operation of the device is as follows:

Assuming that the scraper blade 17 is latched in its retracted position shown in Figs. 2 and 4, and that a person desires to use the blade to scrape foreign matter from his or her footwear, the foot can be engaged with the latching lug 31 to depress the latter sufficiently to clear the transverse bar 23 and thus release the blade so that the latter will be moved to its projected position under the action of the spring 25 and aided by the flexed ends 32 of the blade. By successively drawing the foot across the blade in a direction away from the running board, any foreign matter adhering to the shoe will be scraped therefrom by the blade and will gravitate from the blade to the ground.

When the scraping operation is completed, and it is desired to restore the blade to retracted position, the shoe is engaged with the transverse bar 23 and the latter pushed inwardly towards the running board, the latching lug 31 having an inclined face 33 which is engaged by the lower edge of the blade, to cam the lug downwardly and permit the blade and bar 23 to pass the lug, after which the lug automatically engages the bar 23 under the action of the spring 29 to latch the blade in its retracted position.

Although I have herein shown and described only one form of scraping device for footwear embodying my invention, it is to be understood that various changes and modifications may be made therein without departing from the spirit of the invention and the spirit and scope of the appended claims.

I claim:

1. A device of the character described comprising a scraper element, and means by which the element is capable of being mounted for movement on a vehicle running board to occupy an unobstructing position with respect to a person mounting the running board and another position wherein the element is accessible for the scraping from footwear, of foreign matter adhering thereto, said scraper element comprising a flexible blade adapted to engage and be flexed by the running board when the blade occupies its first mentioned position so as to tend to urge the blade towards the last mentioned position, and means for releasably retaining the blade in the first mentioned position.

2. A scraping device comprising a frame adapted to be secured to the underside of a vehicle's running board and having a base portion and spaced apart angularly disposed flanges provided with registering openings, bars freely received in the openings for sliding movement on the frame, and having angularly disposed extensions, a cross bar spanning the bars and secured to the extensions of the latter to rigidly connect the bars, a scraper blade spanning the bars and secured to the extensions of the latter, means for urging the bars towards one extreme position, means for releasably retaining the bars in another extreme position, and means for limiting the movement of the bars to the first mentioned position.

3. A scraping device comprising a frame adapted to be secured to the underside of a vehicle's running board and having a base portion and spaced apart angularly disposed flanges provided with registering openings, bars freely received in the openings for sliding movement on the frame, and having angularly disposed extensions, a cross bar spanning the bars and secured to the extensions of the latter to rigidly connect the bars, a scraper blade spanning the bars and secured to the extensions of the latter, pins on the bars, a stud secured to the frame, a spring wound upon the stud and having arms engageable with said pins to normally urge the bars towards one extreme position, a flat spring secured to the frame and having a latching lug engageable with said cross bar and normally urged by the spring to latch the bars in another extreme position, and other pins on the bars engageable with the frame to limit movement of the bars to the first mentioned extreme position.

Signed at Los Angeles, in the county of Los Angeles and State of California, this 24th day of May, A. D. 1928.

FRANK P. McNULTY.